United States Patent [19]

Hilton et al.

[11] Patent Number: 5,352,390
[45] Date of Patent: Oct. 4, 1994

[54] CEMENTITIOUS COMPOSITIONS CONTAINING SHREDDED POLYSTYRENE AGGREGATE

[75] Inventors: Dennis M. Hilton, Londonderry, N.H.; Paul E. Korenberg, Carlisle, Mass.

[73] Assignee: W. R. Grace & Co.-Conn., New York, N.Y.

[21] Appl. No.: 31,041

[22] Filed: Mar. 11, 1993

Related U.S. Application Data

[63] Continuation of Ser. No. 850,217, Mar. 12, 1992, abandoned, which is a continuation of Ser. No. 384,941, Jul. 25, 1989, abandoned.

[51] Int. Cl.[5] .................. C09K 21/00; B27N 9/00
[52] U.S. Cl. ................... 252/601; 252/602; 106/18.11; 428/402; 428/920; 428/921; 264/140
[58] Field of Search .............. 252/601, 602; 106/18.1, 106/90, 93, 97, 169, 111, 114, 115; 428/402, 404, 407, 920, 921, 117, 103; 241/21; 264/140

[56] References Cited

U.S. PATENT DOCUMENTS

| | | | |
|---|---|---|---|
| 2,611,486 | 9/1952 | Varcoe | 209/237 |
| 3,021,291 | 2/1962 | Thiessen | 260/2.5 |
| 3,161,587 | 12/1964 | Bach | 209/3 |
| 3,257,338 | 6/1966 | Sefton | 260/2.5 |
| 3,272,765 | 9/1966 | Sefton | 260/2.5 |
| 3,348,848 | 8/1967 | Hamilton | 260/2.5 |
| 3,361,688 | 1/1968 | Bonitz et al. | 260/2.5 |
| 3,620,368 | 11/1971 | Comis et al. | 209/2 |
| 3,627,211 | 12/1971 | Leach | 241/3 |
| 3,630,820 | 12/1971 | Leach | 161/168 |
| 3,686,068 | 8/1972 | Leach | 161/168 |
| 3,697,366 | 10/1972 | Harlock et al. | 161/159 |
| 3,719,276 | 3/1973 | Allen et al. | 209/240 |
| 3,719,513 | 3/1973 | Bragg et al. | 106/114 |
| 3,764,357 | 10/1973 | Bowles et al. | 106/90 |
| 3,839,059 | 10/1974 | Rothfelder et al. | 106/115 |
| 3,864,602 | 2/1975 | Feder | 317/2 |
| 3,883,359 | 5/1975 | Harvey | 106/64 |
| 3,990,936 | 11/1976 | Geschwender | 428/116 |
| 4,040,855 | 8/1977 | Rady-Pentek et al. | 106/90 |
| 4,045,268 | 8/1977 | Geschwender | 428/117 |
| 4,076,880 | 2/1978 | Geschwender | 428/118 |
| 4,100,242 | 7/1978 | Leach | 264/115 |
| 4,111,862 | 9/1978 | Geschwender | 428/117 |
| 4,207,378 | 6/1980 | Klein | 428/402 |
| 4,223,066 | 9/1980 | Boyle | 428/306 |
| 4,225,358 | 9/1980 | Maier | 106/90 |
| 4,247,649 | 1/1981 | Damiens | 521/55 |
| 4,249,655 | 2/1981 | Paturess et al. | 209/31 |
| 4,261,817 | 4/1981 | Edwards et al. | 209/321 |
| 4,427,157 | 1/1984 | Klein | 241/15 |
| 4,751,024 | 6/1988 | Shu et al. | 252/601 |
| 4,781,983 | 11/1988 | Stickley | 428/407 |

FOREIGN PATENT DOCUMENTS

| | | |
|---|---|---|
| 0241205 | 10/1987 | European Pat. Off. |
| 2227188 | 12/1973 | Fed. Rep. of Germany |
| 2449385 | 6/1976 | Fed. Rep. of Germany |
| 8225478 | 8/1986 | Japan |
| 517051 | 2/1972 | Switzerland |

OTHER PUBLICATIONS

World Patents Index JP-A-57 140 360 Abstract.
Chemical Abstract v. 93 No. 10 JP-A-55 020 283 Abstract.

*Primary Examiner*—Richard D. Lovering
*Assistant Examiner*—Joseph D. Anthony
*Attorney, Agent, or Firm*—Kevin S. Lemack; William L. Baker

[57] ABSTRACT

Fireproofing compositions are provided. The compositions comprise a hydratable cementitious binder and polystyrene aggregate falling within particular particle size distribution limits. The compositions can also include an air entraining agent and a fibrous material. On addition of water, the compositions form settable, sprayable slurries which can be pumped to the point of application. The slurries are capable of spray application to steel structural members and adhere to the member in the slurried state and after setting. Excellent fire and heat protection is provided to the member despite the organic nature of the polystyrene aggregate.

19 Claims, 6 Drawing Sheets

CEMENTITIOUS COMPOSITIONS CONTAINING SHREDDED POLYSTYRENE AGGREGATE

This is a continuation of co-pending application Ser. No. 07/850,217 filed on Mar. 12, 1992 now abandoned, which is a continuation of co-pending application Ser. No. 07/384,941 filed on Jul. 25, 1989 now abandoned.

BACKGROUND OF THE INVENTION

In the course of erecting steel structures, a thick coating of inorganic material is commonly applied to the metallic structural elements to achieve a number of objectives including fire retardance, improved appearance and sound deadening. While several types of formulations have been applied for these purposes over the years by means of a variety of techniques, one successful system consists of spraying onto the steel surfaces settable aqueous mixes composed essentially of calcined gypsum, a lightweight inorganic aggregate material such as exfoliated vermiculite, a mixture of fibrous materials such as a high wet bulking cellulose fiber and glass fiber, and an air entraining agent. A composition of this type is described by Bragg in U.S. Pat. Nos. 3,719,573 and 3,839,059, along with the most desirable application technique, i.e., pumping the aqueous mix and spraying it directly onto the steel in one layer.

In order to be suitable for such use, coating mixes, both in the wet and dry state, must possess a number of crucial properties. They must be able to hold the large quantity of water that renders them capable of being pumped easily and to great heights. Yet they must retain a consistency sufficient to prevent segregation or settling of ingredients and permit adequate "yield" or coverage of the steel surface at a given thickness. The coating mixes, furthermore, must obviously adhere to steel surfaces, both in the slurried state and in the dry state. Also, the mix must set without the undue expansion or shrinkage which could only result in the formation of cracks that would seriously deter from the insulative value of the dry coating.

As intimated earlier, this complex balance of properties has been substantially achieved heretobefore by gypsum-vermiculite mixes containing cellulosic fiber. However, vermiculite is a naturally occurring mineral which is subject to variation in quality, consistency, and uniformity. Moreover, since the vermiculite mineral must be expanded at very high temperatures prior to use, its cost is subject to unpredictable variations in energy cost.

An alternative to the gypsum-vermiculite mixes is disclosed in U.S. Pat. No. 4,751,024 assigned to the assignee of the instant invention. Specifically, sprayable cementitious compositions containing shredded polystyrene as a lightweight aggregate are taught as fireproofing compositions for structural steel members. The instant invention is directed to an improvement of the compositions disclosed in U.S. Pat. No. 4,751,024.

SUMMARY OF THE INVENTION

In accordance with this invention, it has been found that sprayable cementitious compositions containing shredded polystyrene having particular particle size distribution limits as a lightweight aggregate can be prepared and utilized as spray applied fireproofing compositions for structural steel members. Uniform consistency and quality of the compositions, defined in terms of pumpability, hangability and yield, can now be achieved by controlling the size distribution of the shredded expanded polystyrene in the product. That is, it has been found that the degree of expanded polystyrene "shreddedness" effects the water ratio bulk density, the pumpability and the yield of the cementious compositions. The adhered compositions provide excellent fire and heat insulative protection to the steel despite the organic nature of the polystyrene aggregate. Under fire test conditions, the polystyrene aggregate displays advantageous performance in that it shrinks, melts, and, in effect, disappears out of the fireproofing composition matrix, leaving behind a uniform distribution of cavities which imparts a very low effective thermal conductivity to matrix. This, in turn, increases the effectiveness of the matrix as a barrier to heat transfer.

A number of manufacturing parameters must be controlled in order to obtain shredded expanded polystyrene within the particle size distribution limits of the present invention. A particle size distribution including too many fine or too many coarse shredded expanded polystyrene particles reduce the desirable characteristics of the compositions. The important parameters include: the degree of fusion in the expanded polystyrene board used as a starting material for the aggregate; the rate at which the board is fed into the shredder; the shredding rotor speed; the roughness of the brushes on the shredder; and the tolerance between the brushes. Faster than optimal rotor speed and/or slower than optimal feed rates will produce a shredded expanded polystyrene product that is too fine. In contrast, slower than optimal rotor speeds and/or faster than optimal feed rates will produce a coarse product. Poor quality expanded polystyrene board, that is, board having a low degree of fusion, will produce a coarser, "beady" shredded expanded polystyrene product that detracts from the advantages of the present invention.

The present invention is accordingly directed to settable, sprayable fireproofing compositions, capable of adherence to steel structural members in the slurried and set state, comprising a hydratable cementitious binder and a particular particle size distribution of polystyrene aggregate. In the preferred embodiment, the compositions also comprise an air entraining agent and a fiber component. The invention is further directed to fireproofed steel structural members coated with the fireproofing compositions of this invention.

DETAILED DESCRIPTION OF THE INVENTION

The aggregate used in the present compositions is a shredded polystyrene particle which can be produced by shredding loose expanded polystyrene beads, shredding loose expanded polystyrene "peanuts" (packing insulation), shredding molded polystyrene beadboard, or shredding extruded polystyrene. A method and apparatus for shredding foamed polystyrene are disclosed in U.S. Pat. Nos. 3,627,211 and 3,686,068, the disclosure of which is expressly incorporated by reference herein. As disclosed in these patents, the shredded particles have irregularly shaped exterior surfaces, tears, and ragged edges. The shredding process opens a substantial number of the cells on the surface of the foamed beads, thereby allowing penetration of the cementitious binder into the cellular structure and providing a more integral mix between the binder and the particle.

Figure 1:
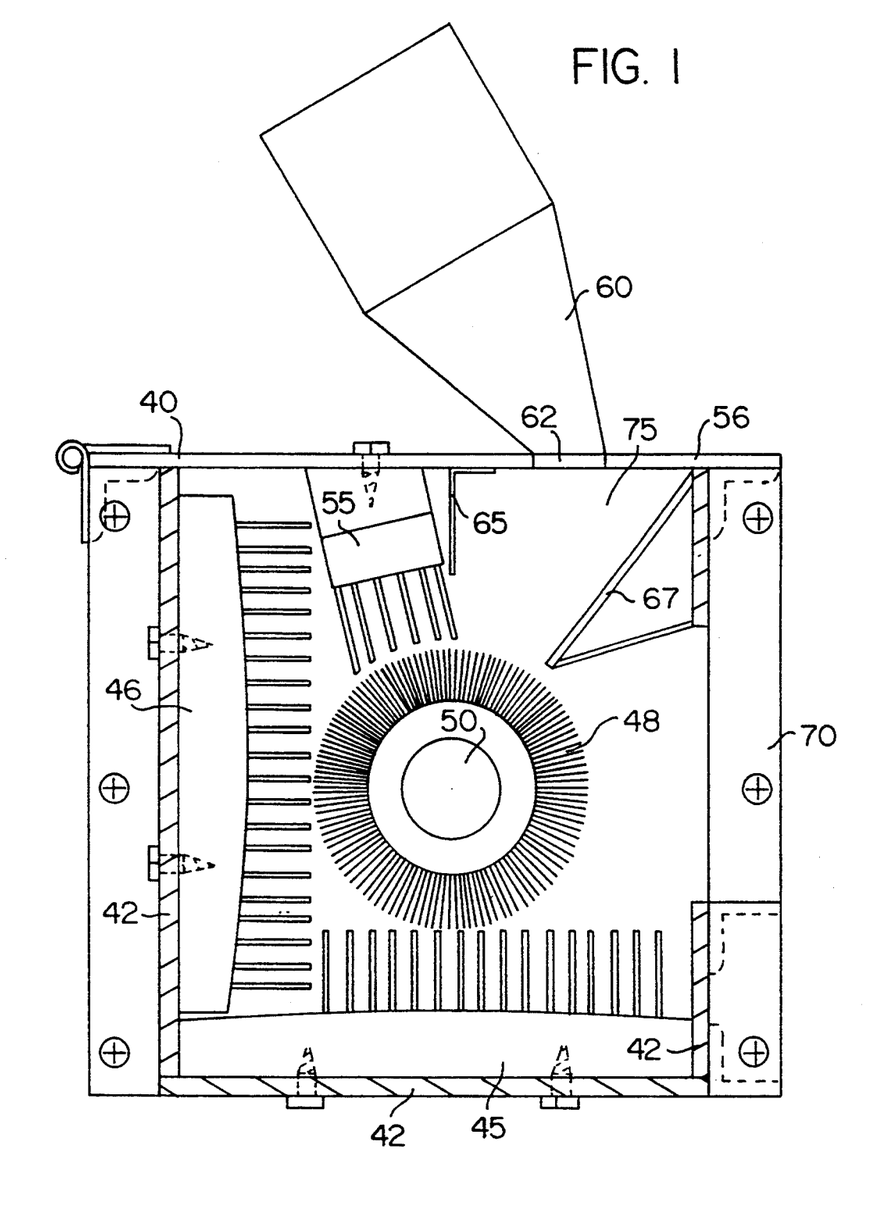
FIG. 1 is a side view of a shredder box for shredding expanded polystyrene to a size distribution in accordance with the present invention.

A particularly suitable shredder for the present invention can be described with reference to FIG. 1. A shredder box 40 is shown defining a chamber 75 which houses support plates 42. Round wire brushes are mounted on a shaft and fastened to the shaft with an adhesive. The assembly is mounted on a lathe and the outside diameter is ground to a uniform diameter; that is, the odd length bristles are cut down and a light cut on all bristles is made. The depth of cut on this trim is about 0.020 inches. This grind results in a "set" in the bristles.

The roter brush 48 is then mounted on shaft 50 in box 40. A measurement establishing the distance of the roter arc from the bottom and back wall of box 40 is established. Stator brushes 45, 46 are then shaped to suit this arc by creep grinding using a surface grinder. Roter brush 48 is removed from box 40, the stator brushes 45, 46 are mounted on support plates 42 by suitable means, such as adhesive and/or lag screws, and the rotor brush 48 is again mounted on shaft 50.

Rotor brush 48 is strategically positioned with respect to stator brushes 45, 46 so as to provide the desired particle size distribution of the shredded material. The tolerance between the rotor and stator brushes can be determined by any suitable means, such as by measuring the torque required to rotate the rotor brush 48. Specifically, the motor (not shown) driving shaft 50 is started and the current draw on the motor is measured. If there is significant contact between the rotor and stator brushes, the current will be high. In such a case, the rotor brush 48 can be removed and the stator brush bristles can be trimmed with a hand-held grinder. The procedure can be repeated until the desired tolerance between the rotor brush 48 and stator brushes 45, 46 is obtained. Preferably there is little or no contact between the rotor and stator brushes.

Once the current is at the proper level, i.e., little or no load, expanded polystyrene is fed through feed rolls (not shown) at an established rate, and the current draw by the motor is again observed. If the current exceeds an established level, the shredder is stopped and the "set" in the rotor brush bristles is relieved. This can be accomplished by hand-filing the bristles while manually turning the rotor brush 48 slowly in the operational direction of rotation. This procedure is carried out across the entire length of the rotor.

The shredder is qualified by three separate expanded polystyrene runs. Shredded expanded polystyrene from each run is sampled and the particle size distribution measured as discussed below. If the measurements meet the established particle size distribution requirements, the shredder is qualified. If the measurements fail to meet the particle size distribution criteria, the "set" of the rotor brush 48 can be readjusted.

Additional wire brushes are provided at 55 and shown mounted on top plate 56 by a lag screw. The bristles of the brush 55 extend down so they are in close proximity to the rotor brush 48. Its function is to prevent chunks of expanded polystyrene from reaching the discharge aperture 62 before they have been shredded appropriately. Suction means 60 such as a hood is provided in communication with the chamber 75 via an aperture 62 in top plate 56. The suction means 60 is connected to the suction side of a materials handling centrifugal fan (not shown), and withdraws the particles shredded by the aforementioned wire brushes. Deflector plates 65 and 67 help direct the shredded particles toward suction means 60. Deflector plate 67 also serves to prevent shredded particles from interfering with raw material being fed to the shredder box 40 through feed aperture 70.

Suitable particle size distributions of shredded expanded polystyrene in accordance with the present invention can be expressed in terms of the amount of particles retained on a #12 standard sieve (having 0.0661 inch holes), and the amount of particles passing through a #30 sieve and retained on a #325 sieve. A #16 sieve can also be used between the #12 and #30 sieves. Suitable amounts of particles retained on a #12 sieve, expressed as a weight percent, are from about 0 to about 20%, with from about 0 to about 10% being preferred, and less that about 8% being especially preferred. Suitable amounts of particles passing through a #30 sieve (having 0.0234 inch holes) and retained on a #325 sieve (having 0.0017 inch holes) are less that about 40% by weight, preferably less than about 30% by weight, with about 14–20% being especially preferred. The desired amount of particles retained by the #12 sieve depends in part on the amount of particles passing through the #30 sieve and retained by the #325 sieve. Where the amount of particles retained by the #12 sieve is less than about 8 percent by weight, it is preferred that the amount of particles passing through the #30 sieve and retained by the #325 sieve is less than about 30% by weight.

Table 1 illustrates the effects of the particle size distribution of shredded expanded polystyrene on the fireproofing performance.

| Batch # | Weight % Retained on #12 Sieve | Weight % Through #30 Sieve and Retained on #325 Sieve | R Value (Water/Dry Fireproofing) | Yield (Board ft/lb Fireproofing) |
| --- | --- | --- | --- | --- |
| 1 | 5.3 ± 1.2 | 19.5 ± 1.5 | 1.45 | 0.604 |
| 2 | 14.3 ± 2.6 | 14.6 ± 2.9 | 1.35 | 0.572 |
| 3 | 21.8 ± 2.0 | 14.6 ± 2.1 | 1.25 | 0.545 |
| 4 | 6.9 ± 0.7 | 65.2 ± 1.0 | 1.10 | 0.383 |

In batch numbers 1–3, the quantity of fine particles (as expressed by the weight percent passing through the #30 sieve and retained on the #325 sieve) was kept at the same general order of magnitude, while the quantity of coarse particles (as expressed by the weight percent retained on the #12 sieve) was increased. Batch number 1 demonstrated the best overall performance, with the highest R value and yield. Batch numbers 2 and 3, with an approximately three-fold and four-fold increase in coarse particles, respectively, showed decreases in R value and yield.

In batch number 4, the quantity of fine particles was increased substantially to fall outside the scope of the present invention, while the amount of coarse particles approximated the amount of batch number 1. The resulting composition retained very little water (R value of 1.10) and exhibited poor yield. The use of any less water in an attempt to increase yield would render the material not pumpable.

Figure 4:
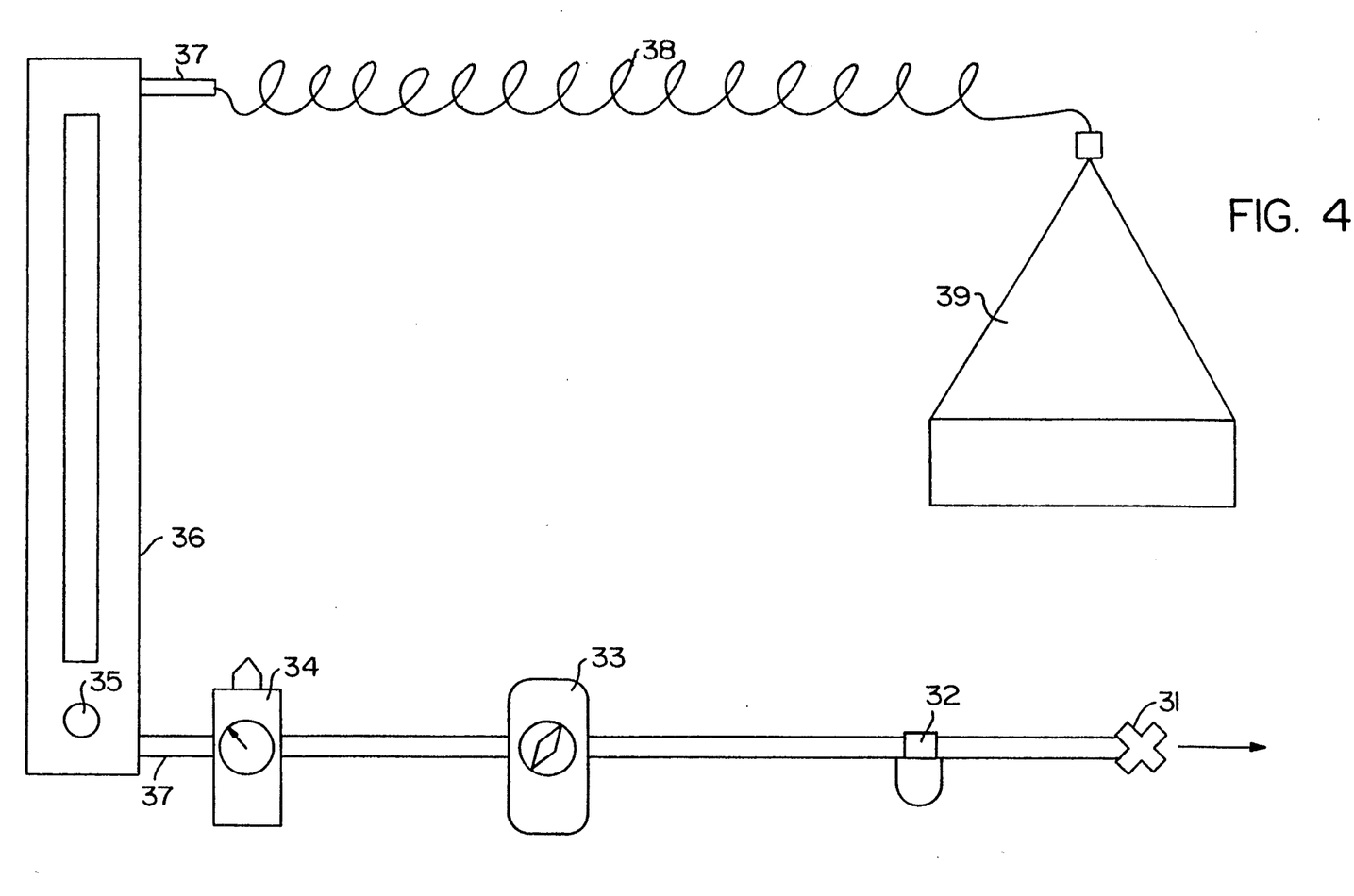
FIG. 4 is a diagrammatic view of the gas supply line used in connection with the apparatus for determining the particle size distribution of a sample.
Figure 5:
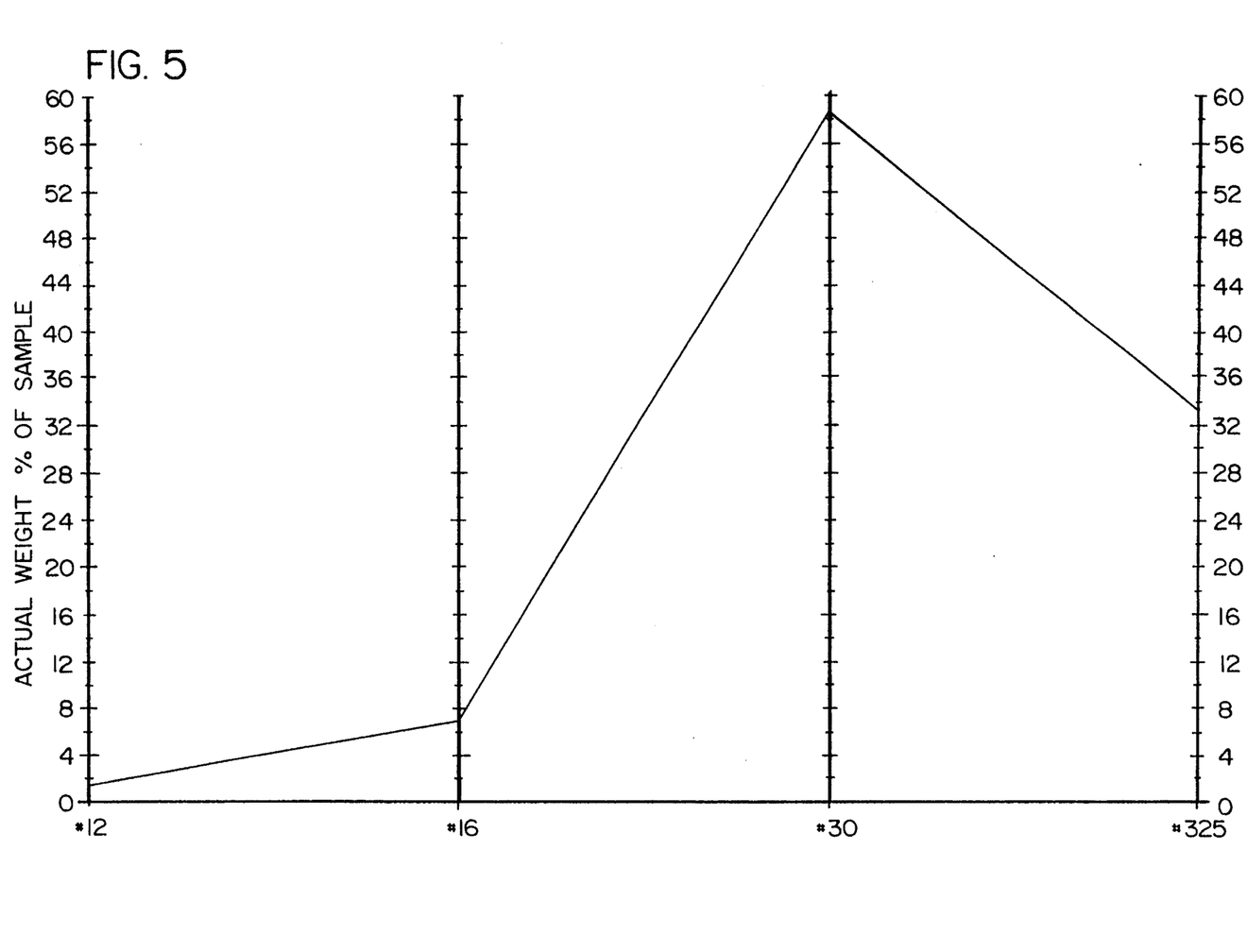
FIG. 5 is a graph depicting a size distribution of shredded expanded polystyrene in accordance with the present invention.

Turning now to FIG. 4, there is shown an example of a particle size distribution curve for a 20 g sample. The weight percent shown is based on the 20 g sample plus approximately 16 grams of anti-static solution (resulting in about 4 grams of solid) added for purposes described below. The weight percent retained on the #12 screen was 1.5%. The weight passing through the #30 screen and retained on the #325 screen was 33.4%. The performance of the composition comprising such a particle size distribution of shredded expanded polystyrene was good.

As mentioned previously, a number of parameters must be controlled to obtain the particle size distribution of shredded expanded polystyrene in accordance with the present invention. The degree of fusion of the expanded polystyrene board affects the shredding and the particle size distribution of the shredded particles. If the beads used to form the board are too weakly fused, the shredding operation will not tear the expanded polystyrene, but instead will merely separate the beads from one another. This will produce a coarser, "beady" product falling outside the particle size distribution contemplated in the present invention.

The rate at which the expanded polystyrene board is fed into the shredder the volume of the board (i.e. its thickness), and the rotor brush diameter also affects the particle size distribution of the resulting shredded expanded polystyrene. Too fast a feed rake will result in too coarse a product, whereas too slow a feed rate will result in too fine a product. A feed rate in the range of from about 140 cubic inches of board volume per second to about 190 cubic inches of board volume per second for a board having a thickness of either 2.0 or 2.8 inches and a rotor brush speed of about 4400 rpm has been found to produce a particle size distribution within the scope of the present invention.

Also affecting the particle size distribution of the shredded expanded polystyrene board is the tolerance between the stator brushes and the rotating brushes, and the relative speed of the brushes. If too large a gap is present between the stator and rotating brushes or if the rotor brushes rotate at too slow a speed, too coarse a product will result. In contrast, if too small a gap exists between the brushes, or if the rotor brushes rotate at too fast a speed, too fine a product will result.

Figure 2:
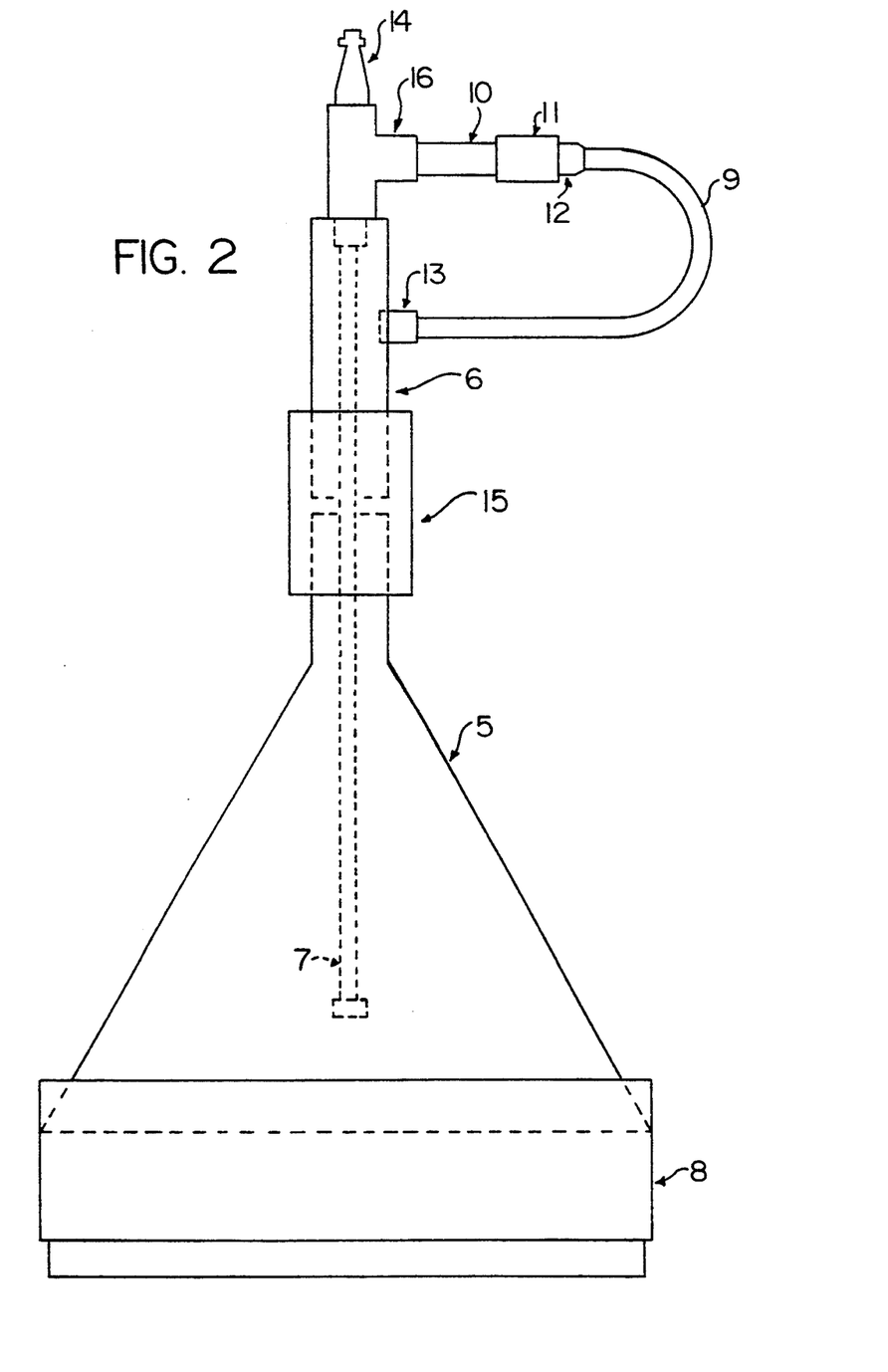
FIG. 2 is a front view of an agitator cap for use in determining the particle size distribution of a sample.

Turning now to FIG. 2, there is shown an agitator cap assembly which forms part of the apparatus used for measuring the particle size distribution of a given sample of lightweight expanded polymer. The assembly includes a conical portion 5 such as an inverted 8" Nalgene funnel. The funnel communicates with gas supply means via tubing 6, such as ¾" PVC pipe, attached to the funnel with coupling 15. A gas such as air is driven from the gas supply means through a quick disconnect mechanism 14, a ⅜" NPT (normal pipe thread) tee 16, and tubing 6 into the chamber means to create a downward draft. The mechanism 14 comprises a male fitting coupled to the tee 16 and a female fitting for connection to the gas supply line (not shown). The mechanism 14 allows for easy and quick connection/disconnection between the agitator cap assembly and the air supply, without the use of tools and without turning off the gas pressure. The assembly also includes means to agitate the sample, such as the gas emitted from a flexible gas driven tube 7 which causes it to randomly move in the conical portion 5 so as to create gas turbulence which prevents the sample from packing onto the screen of sieve 8. The tube 7, preferably formed of latex rubber, should be positioned about three inches above the screen to optimize the agitation of the sample. A weight 4 of about 6.6 grams can be attached to tube 7 to achieve superior agitation.

The downward draft forces particles loosened by the agitation tube 7 through the screen of sieve 8. The gas supply for the downward draft can be tapped off the main supply (which also communicates with tube 7) via a bypass loop 9, which also can be latex tubing. Incorporated in this loop is means to automatically regulate the correct gas pressure and flow rate through the bypass loop, such as a specially designed ⅛ inch close nipple 10 having an inside diameter of 3/32 inches. The nipple is made from a ⅛ inch by ¾ inch NPT close nipple by thoroughly cleaning and degreasing the nipple in a solvent such as acetone. The nipple is then filled with epoxy. When cured, a 3/32 inch diameter hole is drilled in the center of the epoxy, and carefully cleaned out to remove any loose particles without enlarging the hole. The nipple 10 is connected to bypass loop 9 via coupling means 11 and connector means 12. A similar connector means 13 connects the loop 9 to the piping 6.

Gas pressure, flow rate and duration time are critical factors that must be controlled for the apparatus to function optimally. The gas supply pressure and flow rate must be set so as to create a sufficient downward draft to force appropriate particles that can pass through the filtering or size segregating means, such as sieves, to do so, as well as to provide sufficient pressure to the tubing 7 to cause it to randomly move to create enough turbulence in the conical portion 5 to prevent the sample from packing onto the filtering or size segregating means. Air pressure of about 50–51 psi and a flow rate of about 4.9–5.0 cfm is preferred for a 20 gram sample of shredded expanded polystyrene. A time duration of at least about four minutes is preferred for each sieve to provide an accurate, reproducible representation of the particle size distribution of the 20 g sample. A 20 g sample has been found to be representative of a 360 lb. billet.

FIG. 4 shows the various elements that can be used in conjunction with the agitator cap assembly to achieve the correct parameters. A valve 31 of any suitable well known type is shown for quick start or termination of pressure to the system. A filter 32 is downstream from valve 31, and removes contaminates such as oil leaked from the gas supply source such as an air compressor (not shown). Such contaminates may have a deleterious effect on other elements in the system, as well as on the separation results. Filter 32 also helps in removing moisture from condensation from the system. If too much moisture is present for the filter 32 to handle, an air dryer (not shown) can be used. A solenoid valve and timer 33 serves to automate the duration of the particular run. Pressure regulator 34 regulates the gas supply pressure to the desired level, and is equipped with a pressure gauge capable of withstanding the desired operating pressure. A stainless steel needle valve 35 to vary the gas flow rate is built into flowmeter 36. The flowmeter 36 is connected to the line by ¼ inch NPT fittings as its entrance and exit. A ¼ inch nylon coil hose 38 is connected to the agitator cap 39, and allows for freer movement of agitator cap 39.

Figure 2A:
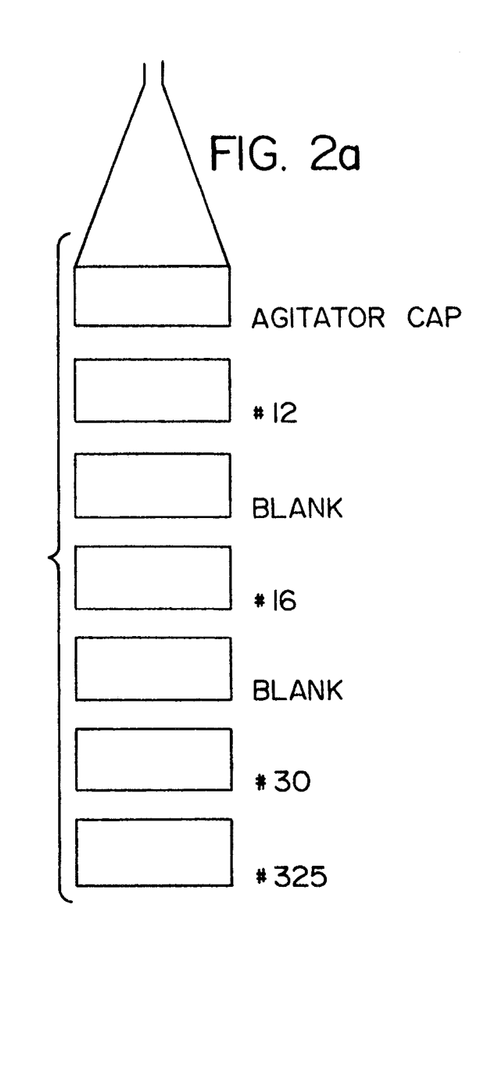
FIGS. 2a, 2b and 2c are schematics of the apparatus for use in determining the particle size distribution of a sample.
Figure 3:
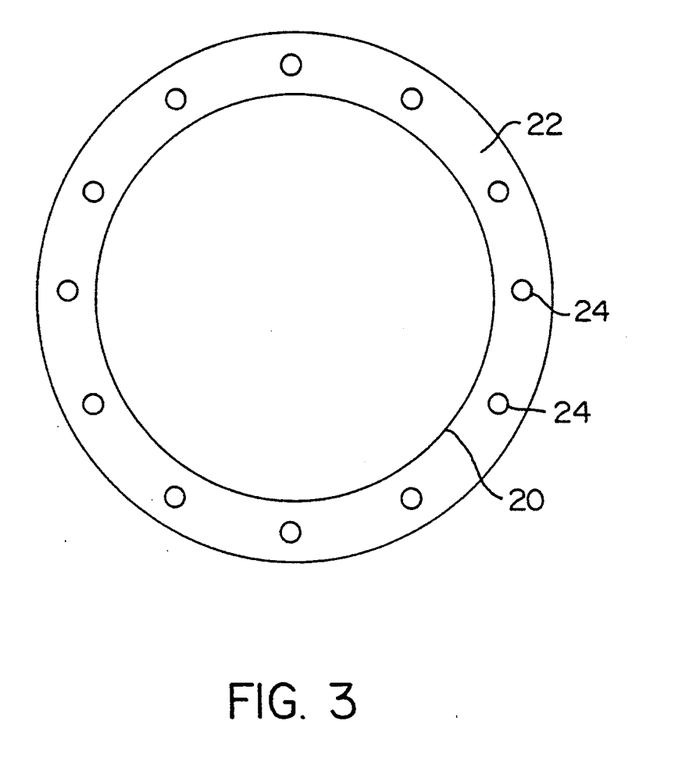
FIG. 3 is a top view of a portion of the apparatus for use in determining the particle size distribution of a sample.

The preferred procedure for determining the particle size distribution of a given sample is as follows. The agitator cap assembly is connected to air supply means (devoid of moisture) set at a pressure of 50–51 psi and a flow rate of 4.9–5.0 scfm. As shown in FIG. 2a, the assembly is placed in communication with a tared #12 sieve. Under the #12 sieve is placed a blank (a sieve with the screen removed) to accommodate the volume of sample used. A tared #16 sieve is placed under the blank, and in turn is followed by a second blank, a tared #30 sieve, and a tared #325 sieve. Typically no blank is required between the #30 and #325 sieves, as the sample volume has been sufficiently reduced by retention on previous screens. The entire sieve pack is then placed on a suitable receptacle which can receive any particles passing through the last sieve as well as allow the flow of air therethrough. FIG. 3 shows a top view of such a receptacle having an aperture 20 through which air and particles can pass. The assembly sits on a portion of surface 22, but does not cover holes 24. Holes 24 allow air passing into the receptacle from the assembly to escape.

Figure 2B:
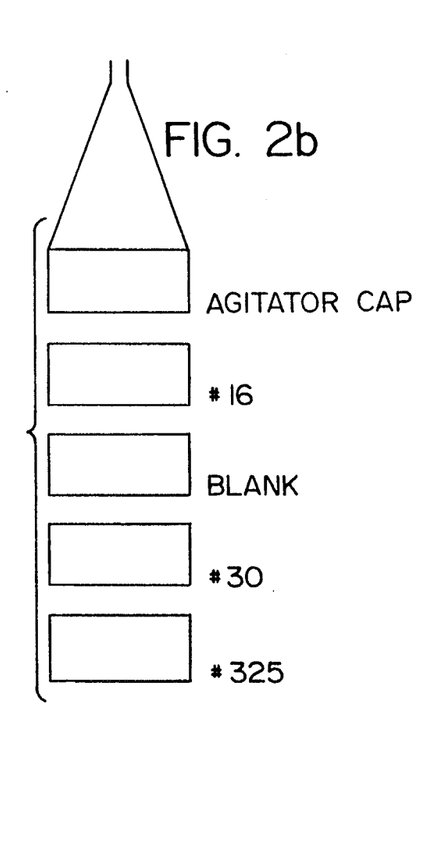
Figure 2C:
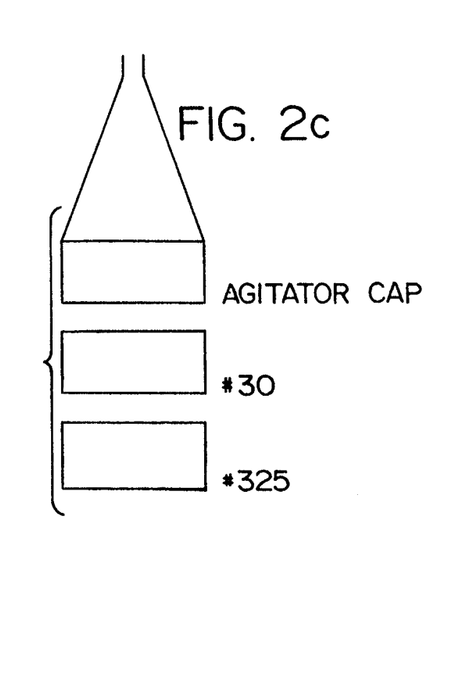

A suitable sample is weighed. A suitable anti-static agent, such as a solution of 80% propanol and 20% silicone/glycol, can be added to the sample to reduce the static electricity of the lightweight expanded polymer that would otherwise build as a result of the constant agitation of the polymer. It is believed that the solution forms a thin layer on the particles without causing any detrimental particle deformation. The agitator cap is removed from the sieve pack, inverted, and the conical portion 5 is filled with the sample. The #12 sieve is then removed from the sieve pack and placed over the wide mouth of the concial portion 5 of the agitator cap so as to act as a cover. The conical portion 5, the sample, and the #12 sieve are placed back on the sieve pack. Air supply is commenced at a pressure of 50–51 psi and a flow rate of 4.9–5.0 scfm, and maintained for about at least four minutes. The air supply is then ceased, the conical portion 5 removed, and the weight of the sample retained on the #12 sieve is determined. The procedure is repeated for the #16 sieve as shown in FIG. 2b, and for the #30 and #325 sieves as shown in FIG. 2c. The procedure need not be applied to the #325 sieve directly, as the measurement of concern is the amount of sample passing through the #30 sieve and retained on the #325 sieve. The amount of sample passing through the #325 sieve is negligible for the present purposes. The amount of material retained on the #16 sieve is not critical.

It is known to shred foam particles and mix the shredded particles with a granulate slurry wherein the granular material may comprise cement particles, sand, gypsum particles and the like. As disclosed, for example, in U.S. Pat. Nos. 3,630,820 and 4,100,242, if a sufficient number of the cells are penetrated by the slurry, the buoyancy of the particles becomes decreased such that the high viscosity of the slurry prevents the particles from rising.

In the pumpable compositions of this invention, it has been found that the decreased buoyancy of the particles is essential for satisfactory conveyance of the compositions through the pump mechanism and feed lines to the point of application. In contrast, non-shredded beads segregate within the slurry and the resultant localized concentration of beads can clog the pump, feed lines, and spray nozzle.

The shredded polystyrene particles are preferably employed in a weight concentration of about 1% to about 5%, based on the total weight of the composition before water addition. (Unless otherwise stated, all weight percentages given herein are similarly based). These concentrations are preferred for providing pumpable, non-segregating, uniform slurries which display desired levels of adhesion to steel substrates and provide excellent fire protection. In addition, the density of slurry compositions containing concentrations of shredded polystyrene within this weight range is sufficiently low after application to ensure that the coating stays in place before and after setting. Thus, "fall-off" of the applied composition due to inadequate adherence or mechanical and structural disturbance is minimized or eliminated.

The density of the shredded polystyrene is preferably in the range of about 0.2 to 0.6 pounds per cubic foot, more preferably about 0.3 to 0.5 pcf. Preferably, the particle size at its maximum dimensions is less than ¼ inch.

Portland cement can be used as the cementitious binder of the invention. However, it is generally preferred to employ a gypsum binder due to its advantageous fireproofing performance. Although the gypsum can be used in relatively low amounts, e.g. as little as 60% by weight, it is generally preferred to employ at least 75% by weight, based on the total weight of the composition, and more preferably at least about 85% by weight.

The fibrous component in the preferred compositions can be either organic or inorganic. Preferably, the fibrous component is a mixture of a high wet bulking organic fiber, preferably cellulose fiber as described in U.S. Pat. Nos. 3,719,513 and 3,839,059, and an inorganic fiber which provides reinforcement, preferably glass fiber. The total amount of the fibrous component in the composition is preferably in the range of about 4% to 20% by weight. A particularly preferred composition comprises about 4% to 10% by weight of high wet bulking cellulosic fiber and about 0% to 2%, most preferably 0.1% to 2%, by weight of glass fiber. It has been found that these particularly preferred fiber loadings, coupled with the preferred loading of about 1% to 5% by weight of shredded polystyrene particles, provides an optimum composition for easy pumping without segregation and for placement in high yield, i.e., placement over a relatively large area, per weight of the dry composition, at a given thickness of application. Yield is generally calculated by methods known in the art as board feet per dry weight of composition. The particularly preferred compositions are capable of providing a high yield of at least about 20 board feet per 45 pounds by weight of the dry composition. Generally, a yield in the range of about 25 to 35 board feet per 45 pounds dry weight is obtained.

The foaming agents or air entraining agents that can be used in the compositions of the invention are well known in the art. Such well known materials as sodium alpha olefin sulfonates, sulfonated monoglycerides, sodium alkyl arylsulfonate, and sodium laurel sulfate can be used in appropriate quantities to provide a slurry of desired density and pumpability. Dry foaming agents can be incorporated into the dry composition before addition of water, while both dry and liquid agents can be added to the slurried composition. Preferred amounts of the air entraining agent are about 0.1% to 0.5% by weight. The combination of air entrainment and shredding of the polystyrene is especially advantageous for providing homogeneity to the slurry, i.e., preventing segregation of the aggregate, for the period of time necessary for pumping, spraying and setting of the slurry.

In certain instances it is also desirable to incorporate into the mix a water retaining agent which allows more water to be incorporated into the slurry, thereby increasing pumpability and yield, while retaining about the same level of adhesion to steel. A preferred water retaining agent is hydroxpropylmethylcellulose.

The dry compositions of this invention are converted to pumpable slurries by addition of water. Generally, the water is added to the dry mix at the job site shortly before being pumped to the point of application. A water:cementitious binder ratio of about 1.0–1 to 2.5:1 is generally employed to provide a pumpable mixture of desired consistency and adhesiveness. A preferred ratio is about 1.2–2.0:1. Generally, a useful range of slurry density, which affords easy pumping, is about 35 pcf to 55 pcf.

What is claimed:

1. A dry fire proofing composition comprising a hydratable cementitious binder and shredded polystyrene aggregate having a particle size distribution such that a range of about 0 to about 20 percent by weight of the particles is retained by a standard #12 sieve and a maximum of about 40 percent by weight of the particles both passes through a standard #30 sieve and is retained by a standard #325 sieve said composition comprising the hydratable cementitious binder from at least 60% by weight and comprising the said polystyrene from about 1% to 5% by weight, wherein the polystyrene has a density in the range of about 0.2 to 0.6 pcf.

2. The composition of claim 1 wherein the particle size distribution of the aggregate is such that less than about 8 percent by weight of the particles are retained by a standard #12 sieve.

3. The composition of claim 2, wherein the particle size distribution of the aggregate is such that less than about 30 percent by weight of the particles passes through a standard #30 sieve and are retained by a standard #325 sieve.

4. The composition of claims 1, 2 or 3 wherein said polystyrene aggregate is selected from the group consisting of shredded expanded polystyrene beads, shredded polystyrene beadboard, shredded polystyrene packing insulation, and shredded extruded polystyrene.

5. The composition of claims 1, 2 or 3 further comprising a fibrous component.

6. The composition of claim 5 wherein said fibrous component comprises a mixture of an organic fibrous material and an inorganic fibrous material.

7. The composition of claim 5 wherein said fibrous component comprises a high wet bulking organic fiber.

8. The composition of claim 7 wherein the organic fiber is cellulose.

9. The composition of claim 5 wherein said fibrous component comprises an inorganic fibrous material.

10. The composition of claim 9 wherein the inorganic fibrous material comprises glass fiber.

11. The composition of claim 1 further comprising about 4% to 10% by weight of high wet bulking cellulose fiber and about 0% to 2% by weight of glass fiber.

12. The composition of claims 1, 2 or 3 further comprising an air entraining agent.

13. The composition of claim s1, 2 or 3 further comprising a water retaining agent.

14. The composition of claim 13 wherein said water retaining agent is hydroxypropylmethylcellulose.

15. A dry fire proofing composition comprising a hydratable cementitious binder, shredded polystyrene aggregate having a particle size distribution such that a range of about 0 to about 20 percent by weight of the particles is retained by a standard #12 sieve and a maximum of about 40 percent by weight of the particles both passes through a standard #30 sieve and is retained by a standard #325 sieve, an air entraining agent, and a fibrous component, said composition providing, on the addition of water, a settable slurry which is capable of spray application to a steel structural member and which, after spray application is adherent to the member in the slurried state and after setting, forming a fire and heat protective adherent coating on the said member said composition comprising the hydratable cementitious binder from at least 60% by weight and comprising the said polystyrene from about 1% to 5% by weight, wherein the polystyrene has a density in the range of about 0.2 to 0.6 pcf.

16. A slurry formed upon the addition of water to the composition of claims 1, 2, 3 or 15, said slurry having a density in the range of 35 pcf to 55 pcf.

17. A slurry of claim 16 providing, after spray application, a yield of at least about 20 board feet per 45 pounds of said dry composition.

18. A fireproofed steel structural member comprising a steel structural member coated with the slurry of claim 17.

19. A fireproofed steel structural member comprising a steel structural member coated with a slurry comprising the composition of claims 1, 2, 3 or 15.

* * * * *